Figure 1:
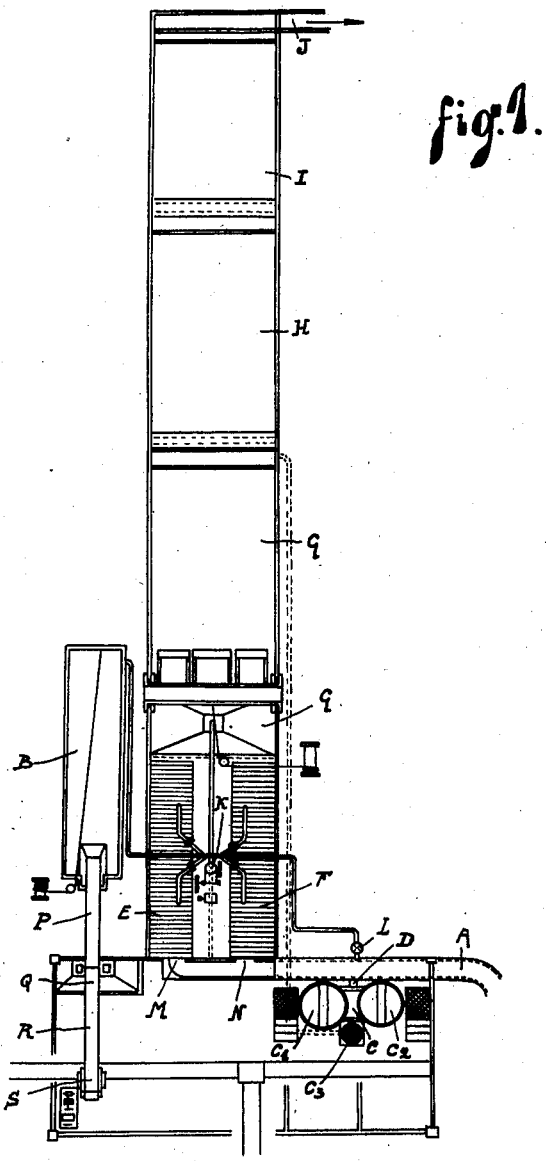

Sept. 22, 1942.   R. A. HENRY   2,296,523
PROCESS FOR THE BIOLOGICAL AND SIMULTANEOUS PURIFICATION
OF WASTE LIQUORS AND THEIR SLIMES
Filed Sept. 10, 1935   3 Sheets-Sheet 1

Inventor:
Rene Auguste Henry
By E. F. Wenderoth
Attorney

Sept. 22, 1942.  R. A. HENRY  2,296,523
PROCESS FOR THE BIOLOGICAL AND SIMULTANEOUS PURIFICATION
OF WASTE LIQUORS AND THEIR SLIMES
Filed Sept. 10, 1935  3 Sheets-Sheet 3

Inventor:
Rene Auguste Henry
By E. F. Wenderoth
Attorney

Patented Sept. 22, 1942

2,296,523

UNITED STATES PATENT OFFICE 2,296,523

PROCESS FOR THE BIOLOGICAL AND SIMULTANEOUS PURIFICATION OF WASTE LIQUORS AND THEIR SLIMES

René Auguste Henry, Brussels, Belgium

Application September 10, 1935, Serial No. 39,987
In Belgium March 11, 1935

4 Claims. (Cl. 210—2)

The present invention relates to a process for the biological and simultaneous purification of waste liquors and their slimes, such as drainage liquors, activated slimes, industrial liquors, sewage, etc.

For this purpose, according to the invention, a suspension of clay in an aqueous solution of lime is added to the waste liquor.

The quantity of clay added to the waste liquor in the form of a suspension is determined by the quantity of clay that can be adsorbed by the organic materials, colloids, oils, fats, soaps, colouring agents and the like existing in the waste liquors.

The quantity of lime in aqueous solution introduced into the waste liquor is determined by the quantity of materials present in the waste liquor, which re-act with the lime and further in order to maintain in the waste liquor an excess of dissolved lime sufficient to make the pH value of the waste liquor increase up to 11 and above, and in order to maintain this basicity for a sufficient length of time to destroy the living organisms, which do not withstand this basicity in the medium considered.

With the object of increasing the compactness and co-efficient of filtration of the slime formed by the colloids adsorbed by the clay, according to the invention inert finely divided and porous substances such as coke dust, soot, ash, etc., are if desired added to the liquor simultaneously with the clay suspension.

According to the invention the slime is extracted from the precipitating basins by a pump which first draws off the surface water from the basin, in order to send it into the purifying circulation, and which when the slime has become sufficiently compact, draws off this slime in order to send it to the discharge basins.

In the case of gelatinous slimes, the colloidal state of which renders filtration difficult, if not impossible, according to the invention in order to make filtration possible and to cause the colloids to lose their water of formation, the slimes are heated to a temperature of at least 42°, and this temperature is maintained for the duration of the filtration.

Further, when the filtration is effected in a rotary drum having filtering cavities subjected to the action of a depression, the filtered material is expelled from these cavities by the steam under pressure, so as to maintain the filtering walls of the filtration apparatus hot.

The accompanying drawings relate to one embodiment of the invention which is given by way of non-limiting example.

The invention includes the various original features which the arrangement illustrated comprises.

Figure 1 is a diagrammatic plan view of an installation for carrying out the process according to the invention.

Figure 2:
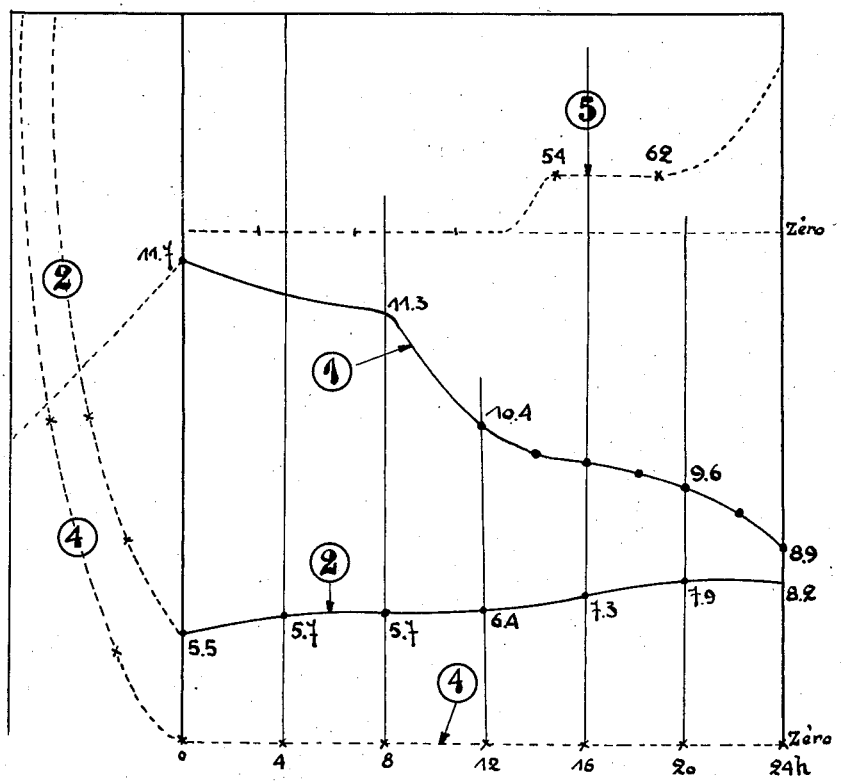
Figure 3:
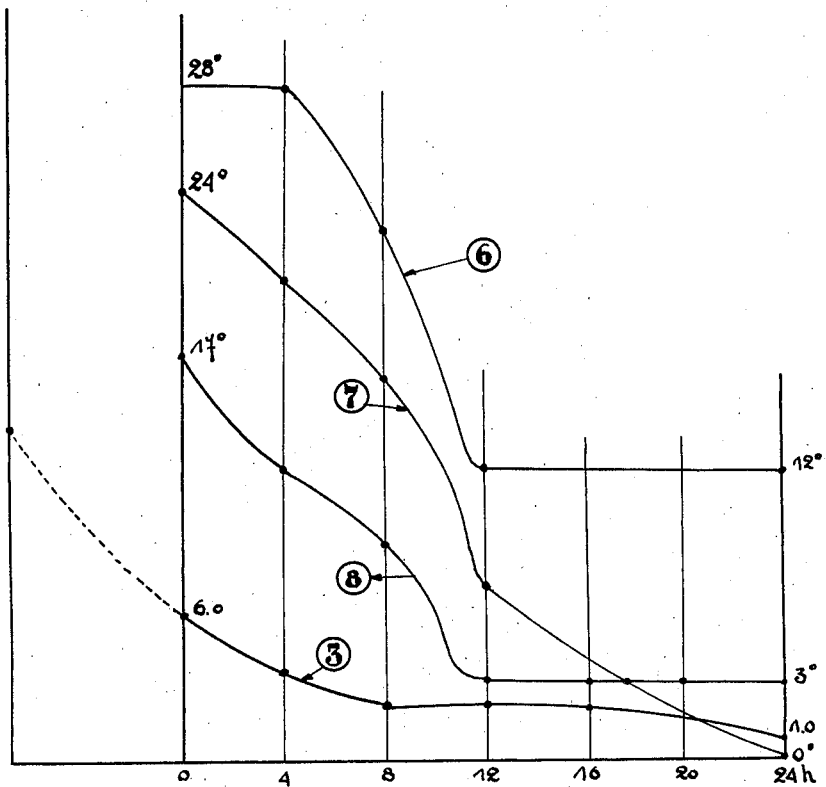

Figures 2 and 3 are diagrams relating to some characteristics of the purified water subjected to aeration for varying lengths of time. The characteristics diagrammed are (1) pH, (2) the biological requirement of oxygen, (3) the content in ammonias, (4) the member of bacterias "colonies," (5) the resistance to development of artificially added bacills, (6) the complete alkalimetric degree, (7) the alkalimetric degree (excluding the bicarbonates and the half of the carbonates) and (8) the hydrotimetric degree.

The process is explained by specifying by way of non-limiting example, one form of application of the process.

The waste liquor which is to be purified biologically, enters through the duct A; this liquor has the following mean characteristics:

Suspended materials, 2630 p. p. m. (parts per million or milligrammes per litre) decomposing as follows:
    Residue after calcination, 1.480 p. p. m.
    Organic materials, 1.150 p. p. m.
Biological requirement of oxygen (BOD) 5 days, 115 to 400 and above.
    TH=7° (in English degrees)
    TA=8.4° (in English degrees)
    TAC=21° (in English degrees)
Soaps _____60 p. p. m.
pH _____ 9.
Total N (calculated in $NH^3$ without nitrites or nitrates _____15 p. p. m.
Bacteria (in colonies per cubic centimeter)_____Uncountable say >4000

The alkali-metric degree (TA) and the complete alkali-metric degree (TAC) referred to above indicate the results of two alkalimetric analyses.

The abbreviations TH, TA and TAC denote respectively the hydrotimetric degree, the alkalimetric degree and the complete alkalimetric degree of the water analyzed.

The hydrotimetric degree TH expresses the hardness and is proportional to the quantities of dissolved salts (alkaline salts being excepted).

The alkalimetric degree TA is proportional to the quantity of hydrates and to half the quantity of carbonates contained in the water analyzed. The titration may be effected by means of sulphuric acid and phenol pthalein being used as indicator.

The complete alkalimetric degree TAC is proportional to the quantities of hydrates, of carbonates and of bicarbonates contained in the water. The titration may be effected by means of sulphuric acid and methyl orange may be used as an indicator.

The unit of measure frequently used in these analyses is the French degree which corresponds to one ten thousandths mole in terms of CaO.

The French degree corresponds to 0.7 English degree.

A machine C manufactures the clay suspension in the aqueous solution of lime and pours it in a continuous manner at D into the water to be purified.

The weight of dissolved lime introduced in the waste liquor cannot according to the invention be less than 15% or 20% of the weight of the organic materials in suspension.

This condition takes into account:
(1) The quantity of lime reacting with the organic material and its constituents.
(2) The necessity of making the pH factor of the waste liquor increase rapidly up to 11 and beyond (which phenomenon provides the active flocculation of the colloids in the medium considered) and of maintaining therein an excess of free hydrates, as long as there are colloids to be precipitated in the liquid.

In practice this condition is fulfilled when the surface liquid attains and retains a transparency greater than 90% of the transparency of distilled water.

In the case of the waste liquor, the characteristics of which have been enumerated above, the quantity of dissolved lime is about 200 p. p. m.

The quantity of clay put into suspension in the waste liquor is according to the invention of the order of magnitude of the weight of the organic material contained in the waste liquor.

The addition of clay is designed to adsorb the flakes of organic material, to give them a sufficient weight to hasten their precipitation by gravity, to form a slime sufficiently concentrated in inert materials to paralyse the development of the bio-organisms contained in the slime, to facilitate the filtration of the slime and its eventual mechanical washing.

For 1 m.$^3$ of waste liquor possessing the characteristics described above, approximately 200 grammes of dissolved lime and 800 grammes of clay in suspension are poured into D.

To the clay may also be added a certain proportion, for example, one-fifth of the weight of the clay of fine and porous inert materials such as coke dust, soot, ash, sludges, etc., which are intended to form with the colloids adsorbed by the clay, the argilo-calcareous flakes and the inert materials, a kind of pudding stone or conglomerate, the large elements of which constitute in the precipitating slime a skeleton assisting the massing up and the filtration or eventual desiccation of the slime.

The special machine C comprises two vats $C_1$ and $C_2$ in which are contained respectively on the one hand the quick lime to be placed in solution and on the other hand the clay to be placed in suspension with, if desired, coke dust or the like.

These vats are provided with a distribution system which pours these materials in a continuous and adjustable manner into a crushing apparatus $C_3$ also supplied in a continuous and adjustable manner with liquor drawn from the end of the purifying installation.

In this way the machine C regulates the relative proportions of the lime and the clay and of the water serving for dissolving the lime and for putting the clay into suspension. Further the quantity of liquid (lime water containing clay in suspension) poured at D into the waste liquor is proportioned to the quantity of waste liquor entering the installation.

Thus for example, when the quantity of waste liquor varies according to the hour of the day, the delivery of the machine C is made to vary automatically by means of a clock.

The mixture produced in D is distributed in the precipitating basins E and F provided with baffles for retaining the oils and the floating bodies.

A first flocculation which is, moreover, almost complete, takes place in these precipitating basins E and F; the slime is deposited at the bottom of these basins and the surface water which is almost clear, flows towards the basin G in order to complete its clarification.

The complementary basins H and I extend the duration of retention of the liquid which issues therefrom at J deprived of suspended materials and bacteria.

The time for which the liquid is retained may be 4 to 6 hours.

The characteristics of the liquor at outlet are as follows:

Suspended materials_____Not measurable (contained less than 1 p. p. m.
Oxygen _____ 8.6 p. p. m.
Biological requirement of oxygen (BOD) (5 days) _____ 5.5 p. p. m.
NH$^3$ _____ 6.0 p. p. m.
pH _____11.7
TH _____11.9° (English degrees)
TA _____16.8° (English degrees)
TAC _____19.6° (English degrees)
Bacteria _____ 0

The purified liquor was subjected to a progressive aeration by an air blast and samples were taken off from hour to hour.

| Nos. | Liquors | Period of aeration | Colonies per c. c. |
|---|---|---|---|
| | | Hours | |
| 1 | Crude drainage liquor | 0 | Uncountable >4000 |
| 2 | Purified liquor | 0 | 0 |
| 3 | do | 3 | 0 |
| 4 | do | 7 | 0 |
| 5 | do | 11 | 0 |
| 6 | do | 15 | 0 |
| 7 | do | 19 | 0 |
| 8 | do | 24 | 0 |

The samples were then infected with stock bacteria and particularly with typhus bacteria.

Results are furnished by the infection in the laboratory of samples 2 to 8 (non aerated or aerated for periods varying from 3 to 24 hours).

The figures represent the means of the various experiments; the artificial infection was effected by one and the same swab of typhus bacteria.

*Purified drainage liquors*

2. No aeration_____Infection maintained for 5 days, 18 hours or 3 hours; no culture, nothing grows.
3. 3 hours aeration_____Infection for 5 days, 18 hours or 3 hours; no culture.
4. 7 hours aeration_____Infection for 5 days, 18 hours or 3 hours; no culture.
5. 11 hours aeration____Infection for 5 days, 18 hours or 3 hours; no culture.
6. 15 hours aeration____Three hours contact non longer suffices to inhibit the culture. Mean: 54 colonies.
7. 19 hours aeration____After three hours of contact. Mean: 62 colonies.
8. 24 hours aeration____After three hours of contact. Mean: 184 colonies.

It is therefore between 11 and 15 hours aeration that the inhibiting conditions disappear.

The accompanying diagrams (Figures 2 and 3) show the variations in some properties of the purified liquor under the influence of air. The properties are measured at different intervals of time and the obtained values are reported in convenient scales. On the diagrams, the points corresponding to properties of the same type are joined so as to obtain lines illustrating the variations. The properties considered will be detailed hereinafter.

The ordinates indicate the different values of the properties considered; the abscissae points 0, 4, 8, 12, 16, 20, 24 correspond respectively to the purified liquor at the outlet and after 4, 8, ... 24 hours aeration, the aeration being obtained by an air blast.

At the left of the diagram a space is reserved for illustrating schematically the variations of some properties during the phase of epuration; this is the case for the curves 1, 2, 3 and 4 hereafter specified. The variations of the pH during the epuration itself is illustrated in dotted line corresponding to the curve 1 at the left part of the diagram, in the space above specified.

The curve No. 1 corresponds to the pH value; the curve No. 2 indicates the variations in the biological requirement of oxygen. The considerable reduction of biological requirement of oxygen obtained by the epuration itself is illustrated in dotted line at the left part of the diagram in the space above specified. The curve No. 3 corresponds to the contents in ammonias; the curve No. 4, in the principal part of the diagram showing the result after epuration, educes itself to an horizontal formed by the abscissae line showing thus that the liquor has become completely deprived of bacteria. At the left part of the diagram the dotted line 4 illustrates the considerable variations of bacteria content obtained by the epuration, which, as experimental results indicate, may have been before the purification of more than 4000 colonies per cm.²

The curve 5 reported at the higher part of the diagram shows how the thus purified liquid is apt to resist to the multiplication of artificially added bacteria. This is apparent by the fact that the purified water is only capable of permitting the development of the added bacilles after an aeration of more than twelve hours. The measures giving these indications are mentioned by 54 and 62 on the curve 5.

The curves Nos. 6, 7 and 8 indicate respectively the variations in the complete alkali-metric degree (TAC), the alkali-metric degree (TA) and the hydrometric degree (TH) as a function of the time of aeration. In order to obtain English degrees it is sufficient to consider 1 French degree corresponds to .7 English degree.

It should further be noted that neither the purified liquors nor the slimes have offensive odours.

The slimes deposited in the basins have a density of the order of 1.25. They are extracted by means of a ball pump K, which can aspirate in all the basins E, F, G, and deliver the pumped slimes either into E or F or to the inlet duct A itself by a channel L. When a basin E or F is considered to require emptying, it is isolated by closing valves M or N.

The pump K first draws off the surface water which it delivers into L and then when this water is eliminated, the pump K delivers the slime at the bottom into a storage basin B. This slime contains about 40% by weight of solid materials and 60% by weight of liquid.

Its great compactness hinders or prevents the development of the bio-organisms it may still contain.

A bucket chain or a scraper conveyor P dips into this storage basin and conveys the slimes to Q where they receive an addition of inert materials. The slime together with the inert materials is then carried upon a base R heated (by steam or hot water) in order to raise the slime to a temperature of at least 42° C.

The latter is then poured into a rotary filter having cavities S. These cavities are subjected to the action of a depression for a considerable part of their circumferential travel, in order to effect the filtration. They are then put into communication with a source of steam under pressure, adapted to cause the filtered slimes to be ejected from these cavities and to maintain the filtering walls at a temperature of at least 42° C.

The slime thus treated is freed from offensive odours and prevents the breeding of mosquitoes and other animalculae. It contains approximately 60% of solid materials and 40% of liquid. The filtration has thus produced a loss of liquid of 20%.

When collecting the slimes treated in the manner described above, it is possible, without having recourse to the mechanical filtration and according to the invention, to obtain a drying action by a natural evaporation in air in storage basins having a suitable surface for the quantity of liquid which must be evaporated per day under the influence of natural agents.

What I claim is:

1. Process for the purification of sewage, drainage liquors and similar waste liquids and their slimes, comprising dissolving calcium hydrate in water to form a solution, forming a suspension of clay in said solution and then adding to the waste liquid the said suspension of clay, the quantity of clay being determined by the quantity of clay that can be adsorbed by the organic materials, colloids, oils, fats, soaps, coloring agents existing in the waste liquid.

2. Process for the purification of sewage, drainage liquors and similar waste liquids and their slimes, comprising dissolving calcium hydrate in water to form a solution, forming a suspension of clay in said solution and then adding to the waste liquid the said suspension of clay, the quantity of dissolved lime being determined by the quantity of materials present in the waste liquid which react chemically with the dissolved calcium hydrate, and further by the requirement of maintaining in the waste liquid an excess of lime sufficient to make the pH factor of the waste liquid rise up to 11 and above and in order to maintain this basicity during a sufficiently long time to destroy the living organisms which do not withstand this basicity in the medium considered.

3. Process for the purification of sewage, drainage liquors, and similar waste liquids and their slimes, comprising dissolving calcium hydrate in water to form a solution, forming a suspension of clay in said solution, adding to the waste liquid the said suspension of clay, conveying the so treated waste liquid into a precipitating basin, assisting the thickening of the precipitate by adding heavy and comminuted materials namely coke dust, soot, ash, simultaneously with the suspension of clay, and then removing the supernatant liquid.

4. Process for the purification of sewage, drainage liquors, and similar waste liquids and their slimes, comprising dissolving hydrate in water to form a solution, forming a suspension of clay in said solution, adding to the waste liquid the said suspension of clay, conveying the so treated waste liquid into a precipitating basin, assisting the thickening of the precipitate by adding heavy and comminuted materials, namely coke dust, soot, ash, simultaneously with the suspension of clay, removing the precipitate from the liquid, heating the removed precipitate to a temperature of at least 42° C. and then filtering the hot precipitate.

RENÉ AUGUSTE HENRY.